J. H. JACKSON.
TUBE COUPLING FOR ELECTRICAL CIRCUITS.
APPLICATION FILED NOV. 11, 1913.

1,148,844. Patented Aug. 3, 1915.

Witnesses:
Lillie E. Herend.

James Horatio Jackson
By Davis & Davis
Attorneys

UNITED STATES PATENT OFFICE.

JAMES HORATIO JACKSON, OF SOUTH KENSINGTON, LONDON, ENGLAND.

TUBE-COUPLING FOR ELECTRICAL CIRCUITS.

1,148,844.  Specification of Letters Patent.  Patented Aug. 3, 1915.

Application filed November 11, 1913. Serial No. 800,339.

*To all whom it may concern:*

Be it known that I, JAMES HORATIO JACKSON, a subject of the King of Great Britain and Ireland, residing at South Kensington, London, S. W., England, have invented an Improved Tube-Coupling for Electrical Circuits, of which the following is a specification.

This invention relates to tube couplings for electrical circuits.

As is now well known it is essential or desirable in many services to secure connection between tubing, or tubing and apparatus, which will afford electrical continuity and various ways have been proposed of accomplishing this result. In some cases the jointing is effective when completed but troublesome to establish, and in other cases the joints can be easily made but are not reliable in use.

A joint which is both easy to make and reliable is obtainable with a coupling of the kind that comprises two or more members having interfitting and co-acting eccentric surfaces which, when the said members and the tubes to be coupled are in position for coupling together, can be locked or gripped by a relative rotary movement between the said members. When such a coupling embodies a central member and two companion end members adapted to secure together two similar tubes, a uniform bore results which is very advantageous where electrical conductors are to be inclosed. On the other hand the number of jointing surfaces is objectionable from the point of view of electrical continuity.

The object of the present invention therefore is to secure all the advantages of simplicity, reliability, uniform bore and electrical continuity when connecting a tube to a fitting such as an elbow or junction box by employing a modification of the known arrangement according to which the fitting is formed with one of the co-acting eccentric surfaces and is in addition socketed to receive the end of the tube to be connected therewith.

Another feature of improvement consists in making the movable member of the coupling eccentric exteriorly in lieu of interiorly and providing the interior eccentric surface in the socketed fitting with which the movable member coöperates, so that the latter takes up the bursting strain.

Figure 1:
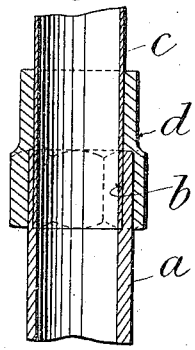
Figure 2:
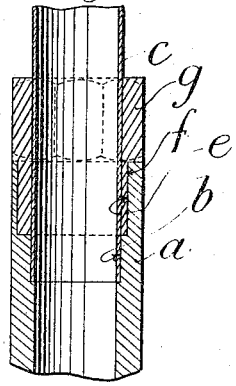
Figure 3:
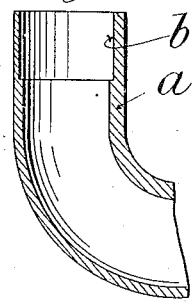
Figure 4:
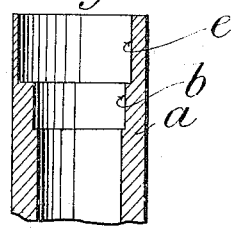
Figure 5:
Figure 6:
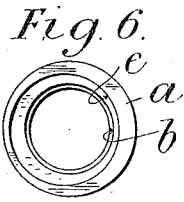
Figure 7:
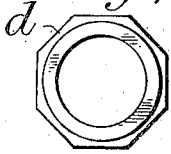
Figure 8:
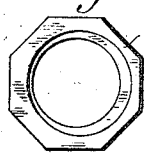
Figure 9:
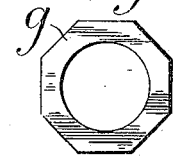
Figure 10:
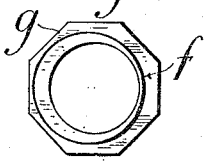

In the accompanying drawings, Figure 1 is a longitudinal section illustrating one way of coupling a tube to a fitting, according to the invention and Fig. 2 is a similar view illustrating another way of effecting the coupling. Fig. 3 is a section of a fitting such as shown in Fig. 1 but curved, and Fig. 4 is a similar view of a fitting such as shown in Fig. 2. Figs. 5 and 6 are plan views corresponding to Figs. 3 and 4. Fig. 7 is a plan and Fig. 8 an underside view of the coupling member of Fig. 1, and Figs. 9 and 10 are similar views of the coupling member of Fig. 2.

As shown in Figs. 1 and 3 the fitting $a$ is formed interiorly of two diameters so as to produce a shouldered socket $b$ for the reception of the tube $c$, the internal eccentric portion of the coupling member $d$ engaging the exterior of the socket portion $b$ of the fitting $a$.

In Figs. 2 and 4 the fitting $a$ is formed with a shouldered socket $b$ to receive the tube $c$ and also with an eccentric socket portion $e$ with which engages the external eccentric portion $f$ of the coupling $g$.

It will be observed from the drawing that the two concentric cylindrical surfaces of the fitting are of equal diameter with the bore and exterior surface, respectively, of the tube, thereby retaining the tube snugly in position against lateral movement and assuring always a uniform continuity of the bore of the tube with the small concentric surface.

What I claim is:—

1. In a tube coupling for electric circuits, the combination with a tube, of a fitting having two concentric cylindrical surfaces of different diameter in axial contiguity forming a shoulder therebetween, said concentric surfaces being of equal diameter with the bore and exterior, respectively, of said tube, whereby said tube will be held against lateral movement and with its bore in uniform continuity with one of the surfaces, said fitting being also provided with an eccentric cylindrical surface, and a coupling sleeve having an eccentric cylindrical surface adapted to coöperate with the eccentric surface on the fitting to bind the tube in position.

2. In a tube coupling for electric circuits, the combination with a tube, of a fitting having two internal concentric cylindrical surfaces of different diameter in axial contiguity forming a shoulder therebetween, said concentric surfaces being of equal diameter with the bore and exterior, respectively, of said tube, whereby said tube will be held against lateral movement and with its bore in uniform continuity with one of the surfaces, said fitting being also provided with an internal eccentric cylindrical surface of larger diameter than said concentric surfaces, and a coupling sleeve having an eccentric cylindrical surface adapted to coöperate with the eccentric surface on the fitting to bind the tube in position.

Signed at London, England, this 30th day of October 1913.

JAMES HORATIO JACKSON.

Witnesses:
VICTOR BALDWIN,
O. J. WORTH.

Copies of this trade-mark may be obtained for five cents each, by addressing the "Commissioner of Patents, Washington, D. C."